US007965172B2

(12) United States Patent
Angell et al.

(10) Patent No.: US 7,965,172 B2
(45) Date of Patent: Jun. 21, 2011

(54) DETECTION OF TOXIC WASTE USING RFIDS

(75) Inventors: Robert L. Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/043,277

(22) Filed: Mar. 6, 2008

(65) Prior Publication Data
US 2009/0224917 A1    Sep. 10, 2009

(51) Int. Cl.
*H04Q 5/24* (2006.01)
(52) U.S. Cl. ............... 340/10.1; 340/540; 340/572.1; 340/505

(58) Field of Classification Search ................ None
See application file for complete search history.

(56) References Cited

U.S. PATENT DOCUMENTS

| 5,532,598 | A * | 7/1996 | Clark et al. .................. 324/326 |
| 5,825,298 | A * | 10/1998 | Walter ..................... 340/825.49 |
| 5,890,068 | A * | 3/1999 | Fattouche et al. ........... 455/456.2 |
| 7,068,170 | B2 * | 6/2006 | Green .......................... 340/572.1 |
| 7,456,418 | B1 * | 11/2008 | Stevens et al. .............. 250/506.1 |
| 2005/0212675 | A1 * | 9/2005 | Green .......................... 340/572.8 |
| 2008/0275287 | A1 * | 11/2008 | Stevens et al. ..................... 588/3 |
| 2009/0224915 | A1 * | 9/2009 | Angell et al. ............... 340/572.1 |
| 2009/0224916 | A1 * | 9/2009 | Angell et al. ............... 340/572.1 |

* cited by examiner

*Primary Examiner* — Travis R Hunnings
(74) *Attorney, Agent, or Firm* — Dillon & Yudell LLP

(57) ABSTRACT

Toxic waste is laced with Radio Frequency Identification (RFID) tags. Subsequently, wherever the RFID tags are detected in an area, a conclusion is drawn that there is a presence, either past or present, of the toxic waste in the area.

18 Claims, 3 Drawing Sheets

US 7,965,172 B2

DETECTION OF TOXIC WASTE USING RFIDS

BACKGROUND OF THE INVENTION

1. Technical Field

The present disclosure relates to the field of processing and manufacturing operations, and specifically to toxic waste created by such operations. Still more particularly, the present disclosure relates to electronically detecting a presence of toxic waste.

2. Description of the Related Art

Toxic waste is defined as material that poses a health risk. Examples of toxic waste include, but are not limited to, carcinogens (which cause cancer), toxins (which cause death or organ damage) and/or teratogens (which cause birth defects.)

Facilities such as chemical processing plants, refineries, manufacturing plants and similar facilities often create toxic waste during their operations. Such toxic waste may include organic and inorganic chemicals, solvents, reagents, etc.; metals/metalloids such as arsenic and gallium; heavy metals such as lead; radioactive material, etc.

Monitoring and tracking toxic waste presents a challenge, both legal and moral, to the facility. Such monitoring and tracking is especially difficult, since it is typically impossible to determine if a substance is a toxic waste simply by looking at it.

SUMMARY OF THE INVENTION

Toxic waste is laced with Radio Frequency Identification (RFID) tags. Subsequently, wherever the RFID tags are detected in an area, a conclusion is drawn that there is a presence, either past or present, of the toxic waste in the area.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
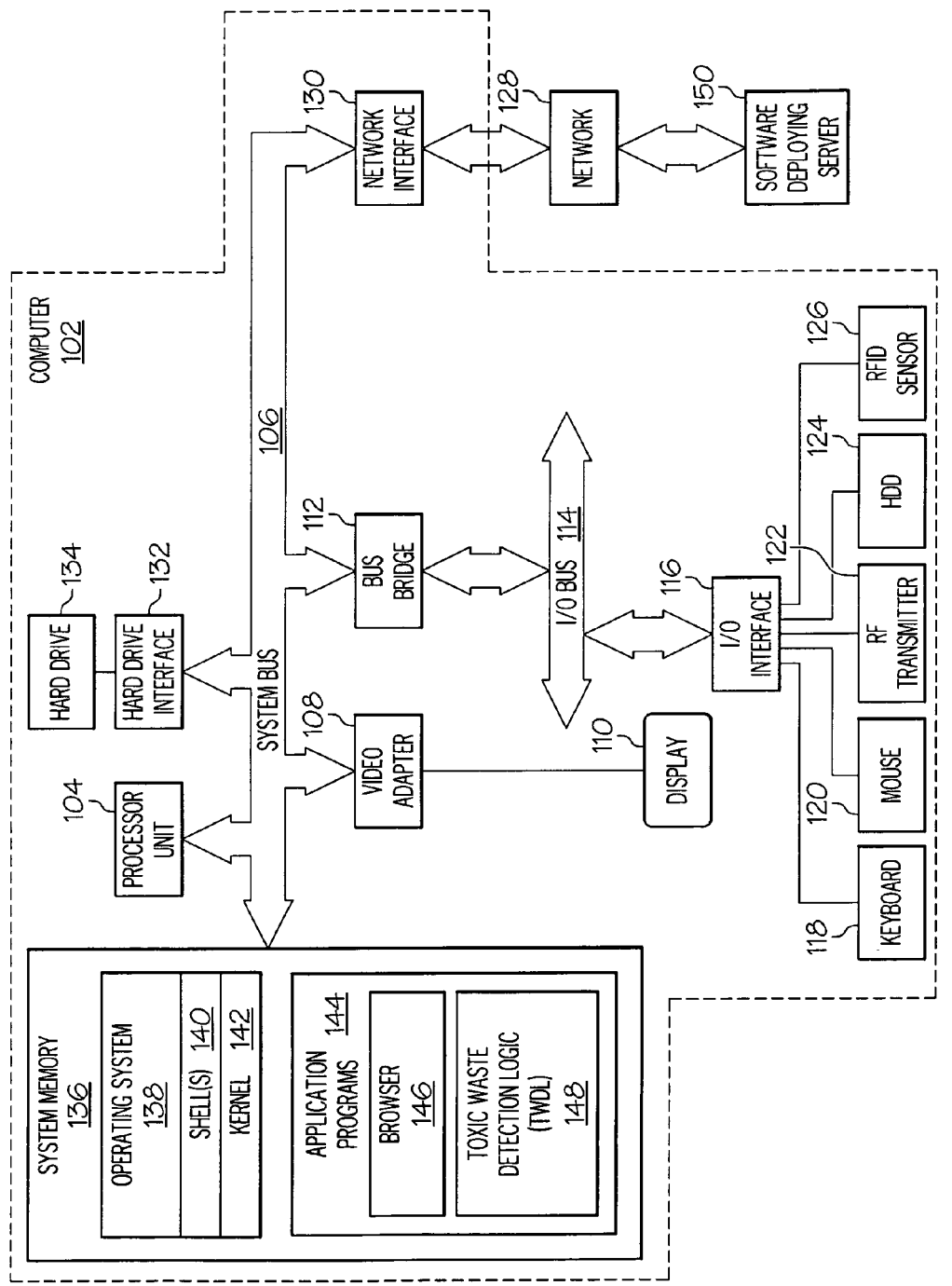
FIG. 1 depicts an exemplary computer which may be utilized by the present invention.

With reference flow to the figures, and in particular to FIG. 1, there is depicted a block diagram of an exemplary computer 102, which the present invention may utilize. Note that some or all of the exemplary architecture shown for computer 102 may be utilized by software deploying server 150.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an RF transmitter 122, a Hard Disk Drive (HDD) 124, and a Radio Frequency Identification (RFID) sensor 126. It should be understood that RF transmitter 122 and RFID sensor 126 should be protected from one another, by distance or a shield (not shown), in order to enable proper functionality of the RFID sensor 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Toxic Waste Detection Logic (TWDL) 148. TWDL 148 includes code for implementing the processes described below, and particularly as described in FIGS. 2 and 4. In one embodiment, computer 102 is able to download TWDL 148 from software deploying server 150, including in an on-demand basis. Note further that, in one embodiment of the present invention, software deploying server 150 performs all of the functions associated with the present invention (including execution of TWDL 148), thus freeing computer 102 from having to use its own internal computing resources to execute TWDL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
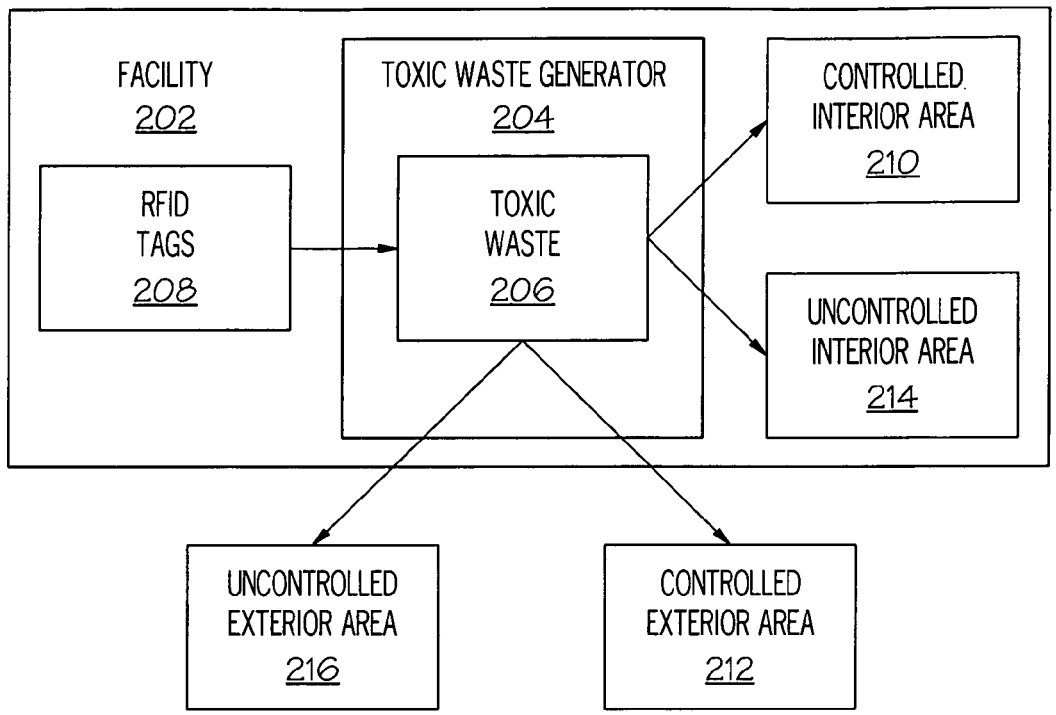
FIG. 2 illustrates a high-level overview of Radio Frequency Identification (RFID) tags being introduced into toxic waste that is produced by a facility.

Referring now to FIG. 2, an exemplary high-level overview of how toxic waste is generated, tagged and dispersed is presented. Consider a facility 202, which includes a toxic waste generator 204 that produces toxic waste 206. Toxic waste generator 204 is any process or equipment in the facility 202 that creates toxic waste 206 during the operation of the toxic waste generator 204. Thus, the toxic waste 206 may be a by-product of a refining or manufacturing process, a lubricant that has been released from a piece of equipment, radioactive coolant or other material from a nuclear power facility, etc.

Figure 3:
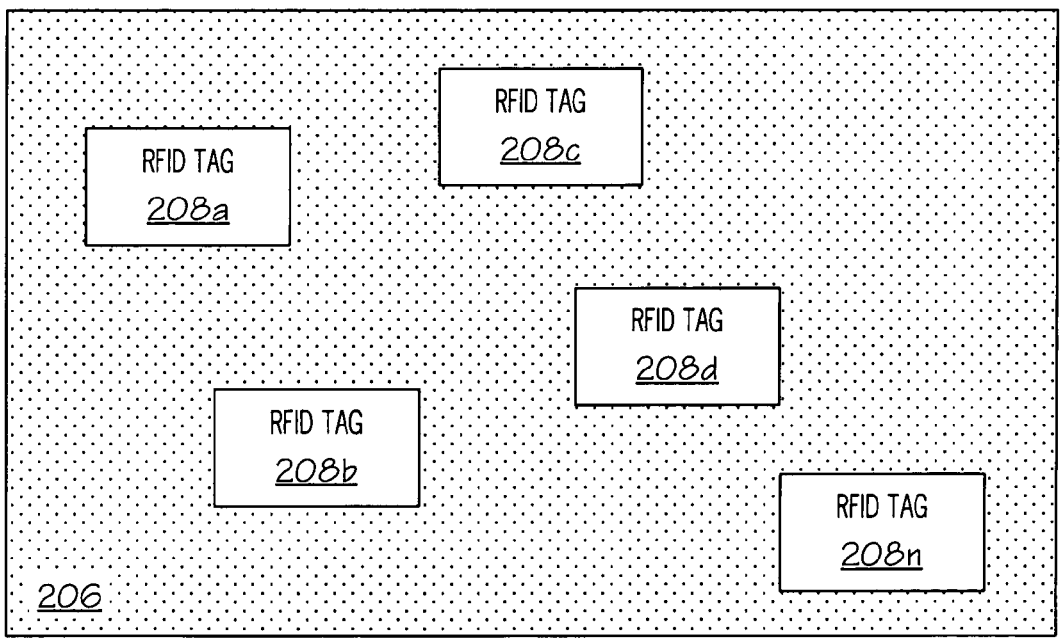
FIG. 3 depicts additional detail of the colloidal state nature of the unadhered RFID tags that lace the toxic waste.

As the toxic waste 206 is generated, or soon thereafter, multiple Radio Frequency Identification tags 208 are introduced into the toxic waste 206. As shown in greater detail in FIG. 3, the toxic waste 206 is laced with multiple RFID tags 208a-n, where "n" is an integer. That is, the multiple RFID tags 208a-n are not adhered to the toxic waste 206, but rather are suspended within the toxic waste 206 in a colloidal state and, preferably, in a uniform distribution.

Note that the RFID tags 208a-n are not shown to scale. That is, the RFID tags 208a-n are preferably small (i.e., less than 0.5 mm×0.5 mm), in order to allow them to flow freely and remain suspended in a colloidal state with the toxic waste 206. In one embodiment, the toxic waste 206 is a dry or slurry material, and thus the RFID tags 208a-n naturally remain uniformly mixed throughout the toxic waste 206. If the toxic waste 206 a liquid, however, then a coating may need to be applied around the RFID tags 208a-n, in order to give them a same specific gravity as the toxic waste 206. This coating should have properties that do not act as a Faraday shield (which would prevent electronic interrogation of the RFID tags 208a-n) around the RFID tags 208a-n.

Examples of RFID tags 208a-n include any type of RFID tag known to those skilled in the art of electronic identification tags for storing and communicating Electronic Product Code (EPC) information, including EPC information for toxic waste 206. This EPC information includes, but is not limited to, a description of the chemical composition and makeup of the toxic waste 206; a name, location, and emergency contact information for the facility 202 that produced the toxic waste 206; and a Material Safety Data Sheet (MSDS) that contains regulation-required information about composition, emergency containment procedures, first aid procedures and other relevant information related to the toxic waste 206.

The RFID tags 208a-n may be active (i.e., battery powered), semi-passive (i.e., powered by a battery and a capacitor that is charged by an RF interrogation signal), or purely passive (i.e., either have a capacitor that is charged by an RF interrogation signal or are geometrically shaped to reflect back specific portions of the RF interrogation signal). However, due their smaller size which allows for a free-flowing toxic material 206 to maintain a uniform distribution of the RFID tags 208a-n, RFID tags 208a-n are preferably passive RFID tags. These passive RFID tags may contain an on-board Integrated Circuit (IC) chip, or they may be chipless.

An RFID tag with an on-board IC chip is made up of two components: the IC chip and a coupled antenna. The IC chip stores and processes information, including EPC information that describes (name, chemical composition, producer, etc.) the toxic waste 206. The IC chip may contain a low-power source (e.g., a capacitor that is charged by an interrogation signal received by the coupled antenna). Upon the capacitor being charged, the IC chip then generates a radio signal, which includes the EPC information, to be broadcast by the coupled antenna.

A chipless RFID tag, as the name implies, does not have an IC chip, but only an antenna that is shaped to reflect back a portion of an interrogation signal. That is, the chipless RFID tag (also known as a Radio Frequency (RF) fiber) is physically shaped to reflect back select portions of a radio interrogation signal from an RF transmission source. Chipless RFID tags typically have much shorter ranges than those that include an on-board IC chip. Furthermore, the amount of information that a chipless RFID tag can return is much smaller than that of an RFID tag that has an on-board IC chip.

Returning to FIG. 2, the toxic waste 206, with the RFID tags 208 suspended therein, may be directed to four generally defined areas: a controlled interior area 210, a controlled exterior area 212, an uncontrolled interior area 214, and an uncontrolled exterior area 216.

The controlled interior area 210 is an area within the boundary of the facility 202 that is designed to contain and/or store the toxic waste 206. Examples of such controlled interior areas 210 include, but are not limited to, a storage tank, a holding pond, etc.

The controlled exterior area 212 is an area that is outside the boundary of the facility 202, but is still designed to contain and/or store the toxic waste 206. Examples of such controlled exterior areas 212 include, but are not limited to, tanker cars, tanker trailers, storage tanks, storage ponds, etc. That is, the controlled exterior area 212 may be in a fixed structure (e.g., a storage tank) or a movable structure (e.g., a tanker car).

The uncontrolled interior area 214 is an area in which the toxic waste 206 is present only as the result of an anomaly, such as a spill, a contamination of an employee's clothing, etc. That is, toxic waste 206 should not be in the uncontrolled interior area 214, since the uncontrolled interior area 214 is not designed to contain or store toxic waste 206, and thus the toxic waste 206 poses a health risk to anyone in the uncontrolled interior area 214. Examples of uncontrolled interior area 214 include, but are not limited to, a cafeteria, a parking lot, offices, lobbies, etc.

The uncontrolled exterior area 216 is an area that is outside the boundary of the facility 202. The presence of toxic waste 206 in the uncontrolled exterior area 216 is also due to an anomaly, such as a spill, etc. An exemplary uncontrolled exterior area 216 is a public transportation way, onto which the toxic waste 206 has been released. For example, consider a scenario in which the toxic waste is initially stored in a transport tanker car (controlled exterior area 212) that overturns when involved in an accident. The toxic waste 206 is now in a ditch, on a railroad, on a public road, etc. (uncontrolled exterior area 216). When a Hazardous Material (HAZMAT) response team arrives at the uncontrolled exterior area 216, it will be unable to identify the toxic waste 206 if a placard on the tanker car is incorrect or missing. However, by scanning the toxic waste 206 with an RFID sensor (e.g., using computer 102 shown in FIG. 1), the HAZMAT team will be able to immediately know what is in the spill, how to contain it, what safety precautions to take, etc. by reading information in the RFID tags 208 that describe the toxic waste 206.

Note that in the scenario of the HAZMAT team responding to a tanker overturning, the RFID sensor will be a portable device. However, RFID sensors (and their associated computers 102 shown in FIG. 1) may be permanently mounted, particularly within uncontrolled interior areas 214. In either scenario (portable or fixed location), the computer 102 may automatically generate a warning signal, such as a flashing light or audible alarm (using a light and/or speaker, not shown, in computer 102).

Note also that there may be scenarios in which the toxic waste 206 is highly volatile (i.e., quickly evaporates). If a toxic waste release occurs, the toxic waste 206 may have evaporated by the time the HAZMAT team arrives. Nonetheless, the area may have been contaminated, or organisms damaged, by the (now evaporated) toxic waste 206. However, by detecting the presence of the RFID tags 208a-n, the HAZMAT team can still determine that the area has been affected by a past presence of the toxic waste 206, and can then take appropriate remediation steps.

Figure 4:
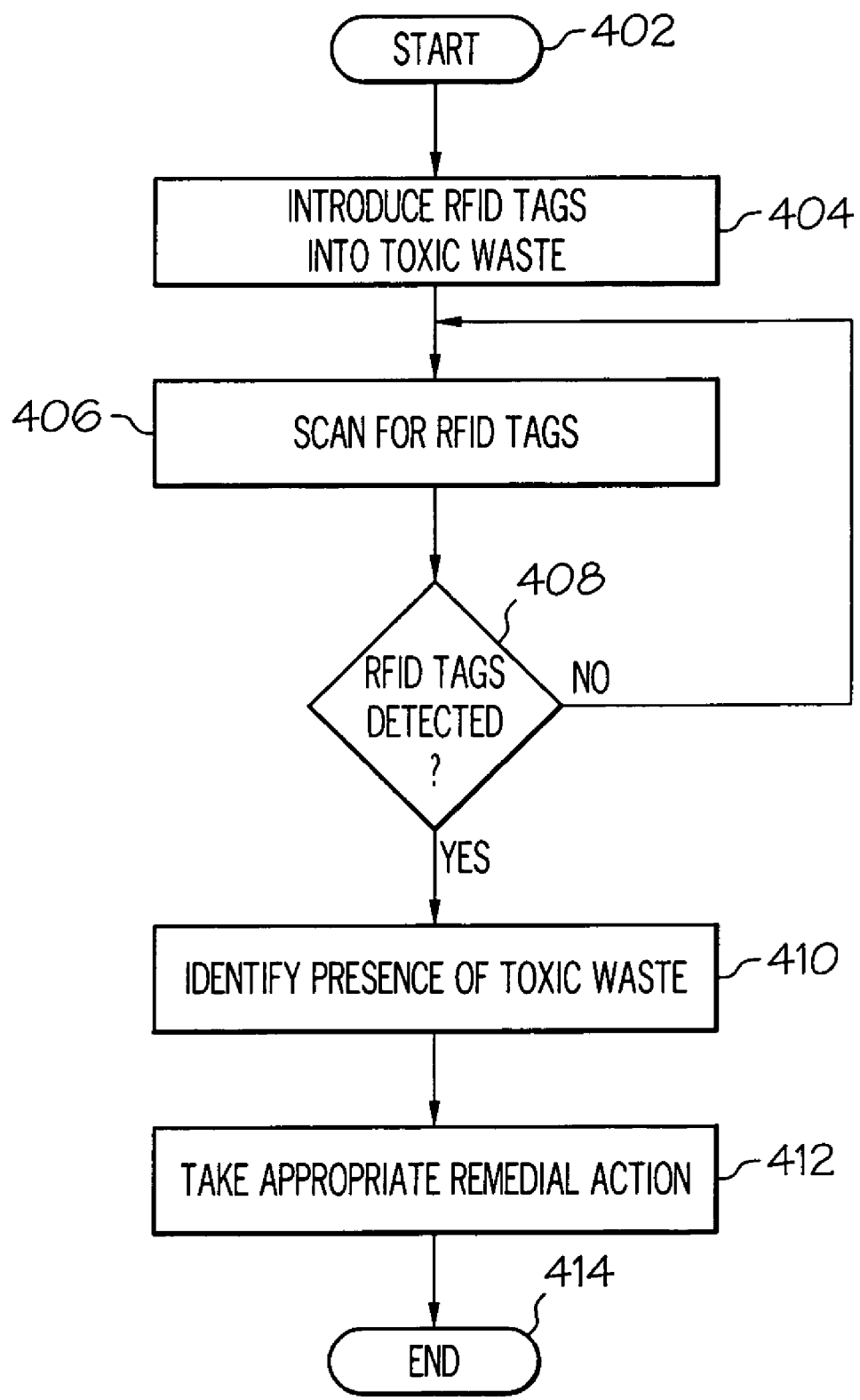
FIG. 4 is a high-level flow-chart of exemplary steps taken to detect a presence of toxic waste by sensing RFID tags that have been introduced into the toxic waste.

With reference now to FIG. 4, a high-level flow-chart of exemplary steps taken to monitor and track toxic waste is presented. After initiator block 402, RFID tags are introduced in a free-flowing colloidal state manner into toxic waste (block 404), preferable at or near the point of creation of the toxic waste. The RFID tags contain stored information about the composition of the toxic waste, when and where the toxic waste was generated, emergency contact information regarding persons with technical knowledge about the toxic waste, emergency procedures (including MSDS information), etc. Subsequently, RFID sensors scan for the RFID tags (block 406), either using portable or fixed-based RFID sensors. This scan process occurs by an RF transmitter (e.g., RF transmitter 122 shown in FIG. 1) sending out an RF interrogation signal, which is responded to, with the response being received by one or more RFID tags (e.g., RFID tags 208a-n shown in FIG. 3). That is, one or more of the RFID tags transmits a response to the RF interrogation signal, wherein the response describes the toxic waste.

If one or more RFID tags that identify the toxic waste are detected (query block 408), then a conclusive determination can be made that the toxic waste is or was present in the area that the RFID tag(s) was detected (block 410). After taking appropriate remediation steps (e.g., clean-up, containment, providing first aid to those exposed, etc.), as depicted in block 412, the process ends (terminator block 414).

Note that while the present specification has presented an exemplary use of RFIDs to identify a presence of toxic waste, the same concepts are available to other uses. For example, the RFIDs may be used to identify any material that is not readily identified by a container labeling. Thus, such material may be toxic or non-toxic, a waste product or byproduct, a desired product, etc. This material may be any loose or liquid material that needs to be readily identified. Furthermore, while RFIDs are used as exemplary electronic tags, any type of electronic device that can be used to identify free-flowing and/or liquid material may be utilized. Examples of such electronic devices include, but are not limited to, quantum dots, magnets, electrostatically charged devices, etc.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of identifying a presence of toxic waste that presents a health hazard, the method comprising:

adding multiple Radio Frequency Identification (RFID) tags to toxic waste that is produced in a facility, wherein the multiple RFID tags are suspended unadhered to the toxic waste in a colloidal state;

wherein the RFID tags store and communicate Electronic Product Code (EPC) information about the toxic waste and the EPC information comprises one or more of: a description of the chemical composition and makeup of toxic waste; a name, location, and emergency contact information for the facility that produced the toxic waste; and a Material Safety Data Sheet (MSDS) that contains regulation-required information about composition, emergency containment procedures, first aid procedures and other relevant information related to the toxic waste;

wherein the RFID tags provides information which describes: a composition of the toxic waste; when and where the toxic material was generated; emergency contact information regarding persons with technical knowledge about the toxic material; and emergency procedures, including MSDS information;

scanning, with an RFID sensor, an area for the RFID tags;

in response to detecting the RFID tags in the area, determining that the toxic waste has been introduced into the area; and determining the composition of the toxic waste by scanning the area in which the toxic waste is present;

wherein the information contained by the RFID tags and returned to the RFID sensor by the RFID tags when scanning the toxic waste enables a HAZMAT team to immediately identify/determine by reading the information returned from a scan of the electronic tags important information including at least: (a) what toxic material is in the spill, (b) how to contain the toxic material, and (c) what safety precautions to take.

2. The method of claim 1, wherein:
the area is one of:
(a) a controlled interior area within the facility, and wherein the controlled interior area is engineered to store the toxic waste; and
(b) a controlled exterior area outside a boundary of the facility, and wherein the controlled exterior area is engineered to store the toxic waste; and
the scanning, with an RFID sensor, of an area for the RFID tags includes scanning one or more of (a) the controlled interior area and (b) the controlled exterior area.

3. The method of claim 1, wherein:
the area is one of:
(a) an uncontrolled interior area within the facility and
(b) an uncontrolled exterior area outside a boundary of the facility, and wherein a presence of the toxic waste in either the uncontrolled interior area or the uncontrolled exterior area is due to an anomaly; and
the scanning, with an RFID sensor, of an area for the RFID tags includes scanning one or more of (a) the uncontrolled interior area and (b) the uncontrolled exterior area; and
in response to detecting the RFID tags in an uncontrolled area, automatically generating a warning signal.

4. The method of claim 3, wherein the anomaly is an accident involving the toxic waste being released from a transport tanker vessel, and wherein the scanning of the uncontrolled exterior area comprises scanning for the RFID tags on a public transportation way.

5. The method of claim 1, wherein the RFID tags provide all information from a Material Safety Data Sheet (MSDS) for the toxic waste, and the method further comprises determining the MSDS for the toxic waste by scanning the area in which the toxic waste is present.

6. The method of claim 1, wherein the toxic waste is highly volatile, and identification of the composition or MSDS of the toxic waste is desired after the toxic waste has evaporated, the method further comprising:
scanning one or more areas surrounding an area in which the toxic waste is believed to have been present before evaporating; and
responsive to a receipt/detection within the area being scanned of identification information associated with a RFID tag from the toxic waste, determining that the area being scanned has been contaminated by a past presence of the toxic waste.

7. The method of claim 1, wherein the RFID tags are introduced into the toxic waste at a location in which the toxic waste is being generated.

8. The method of claim 1, wherein the RFID sensor is one of: (a) a component of a portable RFID detection device; and (b) a component of a fixed-location RFID detection device.

9. A method of electronically tagging a loose/free-flowing material or a liquid material that needs to be readily identified independent of a container in which the material may be held, the method comprising:
adding multiple electronic tags to the material, wherein the multiple electronic tags are suspended unadhered to the material in a colloidal state;
wherein the electronic tags (a) have a sufficiently small dimension to be able to be suspended into the material, (b) contain pre-programmed identification data of the material stored thereon, and (c) are utilized to identify the specific material in which the electronic tags are suspended;
wherein, when the material is a liquid, applying a coating around the electronic tags in order to give the electronic tags a same specific gravity as the liquid material, wherein the coating exhibits properties that do not act as a Faraday shield around the electronic tags, whereby the electronic tags are able to be electronically interrogated for identification information about the liquid material; and
enabling later determination of a presence of the material in a particular area by:
scanning the particular area with a sensor to detect identification information programmed within the electronic tags;
receiving, in response to the scanning, identification information from one of the electronic tags;
outputting the identification information received in response to the scanning to indicate an identity of the material located within the particular location.

10. The method of claim 9, wherein the electronic tags comprise one or more of: quantum dots, magnets, electrostatically charged devices, and radio frequency identification (RFID) tags.

11. The method of claim 9, wherein:
the electronic tags include RFID tags that provide the functionality of storing and communicating Electronic Product Code (EPC) information about the material; and
when the material includes toxic waste, the EPC information comprises: a description of the chemical composition and makeup of toxic waste; a name, location, and emergency contact information for the facility that produced the toxic waste; and a Material Safety Data Sheet (MSDS) that contains regulation-required information about composition, emergency containment procedures, first aid procedures and other relevant information related to the toxic waste.

12. The method of claim 9, wherein:
the electronic tags contain stored information about: a composition of the toxic material; when and where the toxic material was generated; emergency contact information regarding persons with technical knowledge about the toxic material; and emergency procedures, including MSDS information; and
the information contained by the electronic tags and returned to the scanner by the electronic tags when scanning the material enables a HAZMAT team to immediately identify/determine by reading the information returned from a scan of the electronic tags important information including at least: (a) what toxic material is in the spill, (b) how to contain the toxic material, and (c) what safety precautions to take.

13. The method of claim 9, wherein the electronic tags are one or more of:
(d) active, battery powered, tags.
(e) semi-passive tags, which are partially powered by a battery and a capacitor that is charged by a received radio frequency (RF) interrogation signal; and
(f) passive tags which each comprises a capacitor that is charged by an RF interrogation signal and/or is geometrically shaped to reflect back specific portions of the RF interrogation signal.

14. The method of claim 13, wherein:
the passive tags comprise an on-board Integrated Circuit (IC) chip, which stores and processes information, including EPC information that describes the toxic waste, including a name, chemical composition, and producer of the toxic waste;

wherein the IC chip is coupled to an antenna and contains a low-power source that is charged by an interrogation signal received by the antenna; and wherein, when the capacitor is charged, the IC chip generates a radio signal, which includes the EPC information, to be broadcast by the antenna for detection by any receiver device within range of the radio signal, including a scanner from which the interrogation signal is received.

15. The method of claim 13, wherein the RFID tag is a chipless RFID tag, which comprises an antenna that is physically shaped to reflect back a portion of a radio interrogation signal from an RF transmission source.

16. A system comprising:

a processor;

a memory coupled to the processor; and a Radio Frequency Identification (RFID) sensor coupled to the processor, wherein the RFID sensor is enabled to detect multiple RFID tags that are suspended unadhered to a toxic waste;

wherein the RFID tags store and communicate Electronic Product Code (EPC) information about the toxic waste and the EPC information comprises one or more of: a description of the chemical composition and makeup of toxic waste; a name, location, and emergency contact information for the facility that produced the toxic waste; and a Material Safety Data Sheet (MSDS) that contains regulation-required information about composition, emergency containment procedures, first aid procedures and other relevant information related to the toxic waste;

wherein the RFID sensor is enabled to scan an area for the RFID tags; and wherein the processor and memory are enabled to, in response to the RFID sensor detecting the RFID tags in the area, determine that the toxic waste has been introduced into the area.

17. The system of claim 16, wherein:

the RFID tags contain stored information about: a composition of the toxic material; when and where the toxic material was generated; emergency contact information regarding persons with technical knowledge about the toxic material; and emergency procedures, including MSDS information; and the processor and memory processing the information received from the RFID sensor when scanning the toxic material to enable a HAZMAT team to immediately identify/determine specific information, including: (a) what toxic material is in the spill, (b) how to contain the toxic material, and (c) what safety precautions to take.

18. The system of claim 17, wherein:

the RFID tags are one or ore of:
(a) active, battery powered, tags;
(b) semi-passive tags, which are partially powered by a battery and a capacitor that is charged by a received radio frequency (RF) interrogation signal; and
(c) passive tags which each comprises a capacitor that is charged by an RF interrogation signal and/or is geometrically shaped to reflect back specific portions of the RF interrogation signal;

when the RFID tags are passive tags with chips, the passive tags comprise an on-board Integrated Circuit (IC) chip, which stores and processes information, including EPC information that describes the toxic waste, including a name, chemical composition, and producer of the toxic waste;
wherein the IC chip is coupled to an antenna and contains a low-power source that is charged by an interrogation signal received by the antenna; and
wherein, when the capacitor is charged, the IC chip generates a radio signal, which includes the EPC information, to be broadcast by the antenna and which radio signal is detected by the RFID sensor when within range of the radio signal; and when the RFID tag is a chipless RFID tag, which comprises an antenna that is physically shaped to reflect back a portion of a radio interrogation signal from an RF transmission source, the RFID sensor receives a reflected portion of the radio interrogation signal.

* * * * *